United States Patent
Matthiessen et al.

(10) Patent No.: US 9,738,322 B2
(45) Date of Patent: Aug. 22, 2017

(54) FIBROUS COMPOSITE STRUCTURAL ASSEMBLY FOR A MOTOR VEHICLE

(71) Applicant: Bayerische Motoren Werke Aktiengesellschaft, Munich (DE)

(72) Inventors: Dirk Matthiessen, Lengdorf (DE); Mark Muehlhausen, Woerth (DE); Thomas Schneidewind, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/940,418

(22) Filed: Nov. 13, 2015

(65) Prior Publication Data
US 2016/0068199 A1    Mar. 10, 2016

Related U.S. Application Data

(63) Continuation of application No. PCT/EP2014/058506, filed on Apr. 25, 2014.

(30) Foreign Application Priority Data

May 16, 2013    (DE) .......... 10 2013 209 097

(51) Int. Cl.
*B62D 25/04*    (2006.01)
*B62D 25/02*    (2006.01)
(Continued)

(52) U.S. Cl.
CPC ............. *B62D 25/04* (2013.01); *B62D 25/02* (2013.01); *B62D 25/025* (2013.01); *B62D 27/026* (2013.01); *B62D 29/043* (2013.01)

(58) Field of Classification Search
CPC ...... B62D 25/02; B62D 25/025; B62D 25/04; B62D 25/06; B62D 29/04; B62D 29/043
(Continued)

(56) References Cited

U.S. PATENT DOCUMENTS 5,934,745 A * 8/1999 Moore ................... B62D 23/00
296/181.2
6,296,301 B1 * 10/2001 Schroeder ............ B62D 29/046
296/187.02
(Continued)

FOREIGN PATENT DOCUMENTS

CN    102741110 A    10/2012
CN    202923724 U    5/2013
(Continued)

OTHER PUBLICATIONS

English translation of DE 10 2007 038 087; retreived Jan. 5, 2017 via PatentTranslate located at www.epo.org.*
(Continued)

*Primary Examiner* — Jason S Daniels
(74) *Attorney, Agent, or Firm* — Crowell & Moring LLP

(57) ABSTRACT

An assembly for a vehicle body includes the following components: a sill, roof frame, hinge pillar, outer shell and inner shell. The assembly is characterized by being very rigid and very firm, and having a high degree of structural possibilities whilst being relatively light in weight. The sill and the roof frame are formed by hollow profiles. The hinge pillar is made from an extruded fibrous composite. The sill, the roof frame and the hinge pillar are surrounded on the outer side and the inner side, at least partially, by the outer shell and the inner shell, such that the assembly components form a composite unit.

15 Claims, 5 Drawing Sheets

(51) Int. Cl.
  *B62D 29/04*   (2006.01)
  *B62D 27/02*   (2006.01)
(58) Field of Classification Search
  USPC ....... 296/181.2, 187.12, 193.05, 202, 203.03
  See application file for complete search history.

(56) References Cited

U.S. PATENT DOCUMENTS

| | | | |
|---|---|---|---|
| 6,464,290 | B2 | 10/2002 | Schwarz et al. |
| 2002/0030385 | A1 | 3/2002 | Schwarz et al. |
| 2003/0102697 | A1 | 6/2003 | Yakata et al. |
| 2005/0121926 | A1 | 6/2005 | Montanvert et al. |
| 2009/0309387 | A1 | 12/2009 | Goral et al. |
| 2010/0187865 | A1* | 7/2010 | Malek ................... B62D 25/02 296/203.03 |
| 2013/0313862 | A1 | 11/2013 | Yamaji et al. |
| 2015/0375800 | A1* | 12/2015 | Wagner ................ B62D 29/046 296/187.03 |

FOREIGN PATENT DOCUMENTS

| | | |
|---|---|---|
| DE | 100 42 410 A1 | 3/2002 |
| DE | 10 2006 032 472 A1 | 1/2008 |
| DE | 10 2007 010 341 A1 | 7/2008 |
| DE | 10 2007 025 930 A1 | 12/2008 |
| DE | 102007038087 A1 * | 2/2009 ............ B62D 25/02 |
| DE | 10 2010 009 406 A1 | 9/2011 |
| DE | 10 2012 016 389 A1 | 3/2013 |
| EP | 1 557 342 A2 | 7/2005 |
| EP | 1 997 721 A1 | 12/2008 |
| EP | 2 535 242 A1 | 12/2012 |
| JP | 2003-127899 A | 5/2003 |
| WO | WO 2012/105716 A1 | 8/2012 |

OTHER PUBLICATIONS

Chinese Office Action issued in counterpart Chinese Application No. 201480027331.2 dated Oct. 26, 2016 with English translation (12 pages).
International Search Report (PCT/ISA/210) issued in PCT Application No. PCT/EP2014/058506 dated Jul. 14, 2014, with English translation (six (6) pages).
German Search Report issued in counterpart Germany Application No. 10 2013 209 097.8 dated Jan. 27, 2014, with partial English translation (ten (10) pages).

\* cited by examiner

FIBROUS COMPOSITE STRUCTURAL ASSEMBLY FOR A MOTOR VEHICLE

CROSS REFERENCE TO RELATED APPLICATIONS

This application is a continuation of PCT International Application No. PCT/EP2014/058506, filed Apr. 25, 2014, which claims priority under 35 U.S.C. §119 from German Patent Application No. 10 2013 209 097.8, filed May 16, 2013, the entire disclosures of which are herein expressly incorporated by reference.

BACKGROUND AND SUMMARY OF THE INVENTION

The invention relates to an assembly for a vehicle body.

Many assemblies in motor vehicles, including in particular A-pillars, are manufactured from sheet steel in monocoque construction. Shell structures from aluminum are also known in the course of lightweight construction. Among these are assemblies designed as aluminum casting assemblies with welded extruded aluminum profiles. While steel construction dictates a relatively high weight of the assemblies, aluminum construction, both in monocoque and casted construction, meets higher demands in terms of lightweight construction. Only assemblies made from fibrous composites, including hereunder those made from carbon fiber plastics (CFRP), provide a still greater potential for designs with lightweight construction. Due to galvanic corrosion and differential thermal expansion, however, the possibility for combination with lightweight metals is limited. Profile assemblies made from fiber composite plastics which are manufactured through a braiding or winding method also have only limited design possibilities. Moreover, the attachment of functional components, such as door hinges, sealing profiles and the like, is difficult. In addition, the connection of the profiles with one another in a load-bearing node, such as an A-pillar, is complex. In contrast, extrusion materials have a strong degree of freedom in design, however they have a rather brittle fracture behavior in the case of overloading, which is disadvantageous in particular in the case of crash-sensitive assemblies such as an A-pillar. Surface assemblies, such as those produced through a wet pressing method or RTM method, among these in particular CFRP, have a high strength, however they are limited in design.

Based on this prior art, the object of the present invention is to provide an assembly for a vehicle body, having the following assembly components: a sill, roof frame, hinge pillar, outer shell and inner shell, said assembly meeting, on the one hand high, requirements of rigidity and firmness, and, on the other hand, offering a high degree of structural possibilities and options for the integration of connecting means, but which nevertheless has a low weight.

According to the invention, this and other objects are achieved by an assembly for a vehicle body, wherein the sill and the roof frame are formed by hollow profiles. The hinge pillar is made from an extruded fibrous composite. The sill, the roof frame and the hinge pillar are surrounded on the outer side and the inner side, at least partially, by the outer shell and the inner shell, such that the aforementioned assembly components form a composite unit.

By way of this overall construction according to the invention from hollow profiles, extruded components and shells, an assembly for a vehicle body is achieved which can meet complex requirements such as those of high rigidity and firmness, a high degree of freedom in design and the possibility of the integration of secondary functions, such as the attachment of door hinges, seals, equipment components and the like, at the lowest possible weight. In particular, the use of an extruded component for the design of the hinge pillar is especially advantageous, as during the manufacturing thereof, any connecting elements which could contribute to a stable composite unit of the assembly components can already be pressed in.

According to an advantageous development, the hollow profile is formed from a wound, braided or extruded fibrous composite, preferably a carbon fiber composite material. These hollow profiles are characterized by a very good rigidity and firmness and can be manufactured economically.

The assembly according to the invention is further advantageously characterized in that the outer shell and inner shell are formed from a fibrous composite, preferably a carbon fiber composite material, which has a fiber structure or fiber fabric, or which is formed at least partially from a metallic material. Outer and inner shells manufactured in this way form an effective composite unit and contribute to a transfer of force between the hollow profiles and the hinge pillar such that, for example in the event of a crash, the assembly is substantially maintained even with partial deformation or destruction of one of the assembly components.

An advantageous development provides that the fibers in the fibrous composite of the outer shell and the inner shell are oriented, continuous fibers, wherein the fibers are aligned in the main loading direction of the assembly. In this way, the rigidity and firmness of the assembly is increased, and a deformation under the action of mechanical load is effectively counteracted.

To obtain a high degree of design freedom with very good rigidity and firmness, it is advantageously provided that the extruded fibrous composite of the hinge pillar is preferably formed from a carbon fiber composite material, and further advantageously, comprises fibers having a fiber length from 8 to 40 mm, preferably from 10 to 30 mm.

The assembly components are further advantageously connected to one another by a high-strength adhesive bond. The bond between the assembly components is thereby promoted, which contributes to the stability of the assembly according to the invention.

According to an advantageous development, the composite unit of the assembly components has a ductility which is sufficient to absorb energy in the event of a crash, and to ensure the connection of the assembly components even with partial destruction of the individual assembly components.

In order to provide a good connection between the hinge pillar and both the outer shell and the inner shell, it is further advantageous to form the hinge pillar in a meandering shape.

A further advantageous development provides that the hinge pillar includes further components, such as fixtures for door hinges and door checks, wire harness feedthroughs, equipment components, for example speakers, fasteners for interior trim components, connecting elements and the like. This increases the design freedom and thus the functionality of the assembly according to the invention.

The assembly for a vehicle body according to the invention is, in particular, an A-pillar. Because in a vehicle particularly high demands are made of an A-pillar, both in terms of mechanical properties such as ductility, rigidity and firmness, as well as in terms of design options, the assembly according to the invention is particularly well-suited for the formation of an A-pillar.

In particular the following advantages result due to the embodiments according to the invention:

Mechanical properties such as torsion strength and static and dynamic rigidity can be improved;

The firmness of the assembly is increased;

Intrusions during side impact and when force is applied to the roof frame are reduced by the shape- and material-optimized construction;

The assembly comprises a very good composite unit of the assembly components, which even under partial impairment of one of the assembly components still provides sufficient stability;

The weight of the assembly according to the invention is lower with equal properties than the conventional construction of steel or aluminum; and An integration of other components such as equipment components, fastening devices or connecting elements is possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
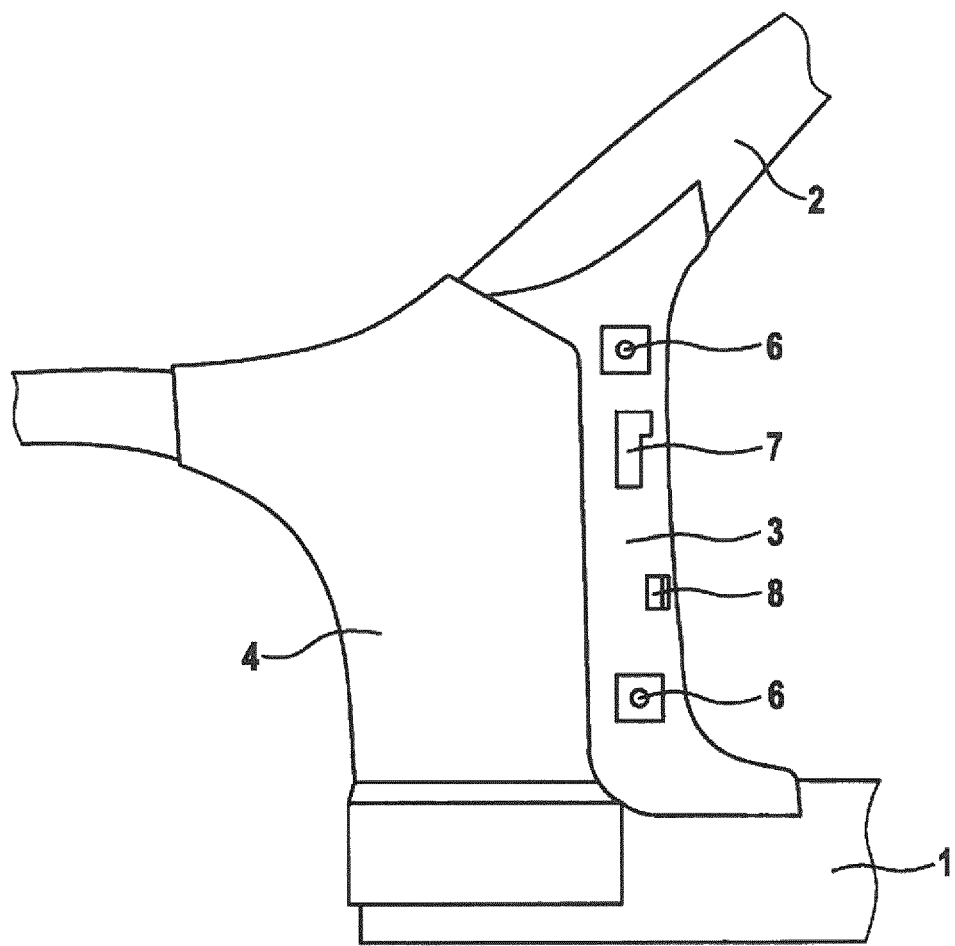
FIG. 1 is a simplified side view of a left A-pillar of a motor vehicle seen from the outside.

In the figures, only the parts of the assembly for a motor vehicle body which are of interest here are represented; all other elements are omitted for the sake of clarity. Furthermore, like reference characters represent the same components.

In the figures, the assembly according to the invention is explained using the example of an A-pillar for a body for a motor vehicle. However, the assembly according to the invention may also be used for other body parts, such as a B and/or C pillar.

According to FIG. 1, the assembly includes a sill 1, a roof frame 2 and a hinge pillar 3, as well as an outer shell 4 and an inner shell (not shown in FIG. 1). The outer shell 4 and the inner shell surround the sill 1, the roof frame 2 and the hinge pillar 3. The sill 1 and the roof frame 2 are formed as hollow profiles, which are preferably formed from a wound, braided or extruded fibrous composite, preferably a carbon fiber composite material.

Through the enclosing of the outer shell 4 and the inner shell, a stable composite unit exists between the assembly components, which promotes a force transfer between the hollow profiles and the hinge pillar 3 formed from an extruded fibrous composite. This contributes to the stability of the assembly.

The hinge pillar 3 formed from extruded fibrous composite is characterized by a high degree of design freedom (structural possibilities). Represented by way of example are door hinges 6, a wire harness feedthrough 7 and a door check 8. Other equipment elements and connecting elements may be integrated into the hinge pillar 3.

The assembly components are advantageously connected with one another by use of a high-strength adhesive bond, which promotes a stable assembly component composite unit.

Figure 2:
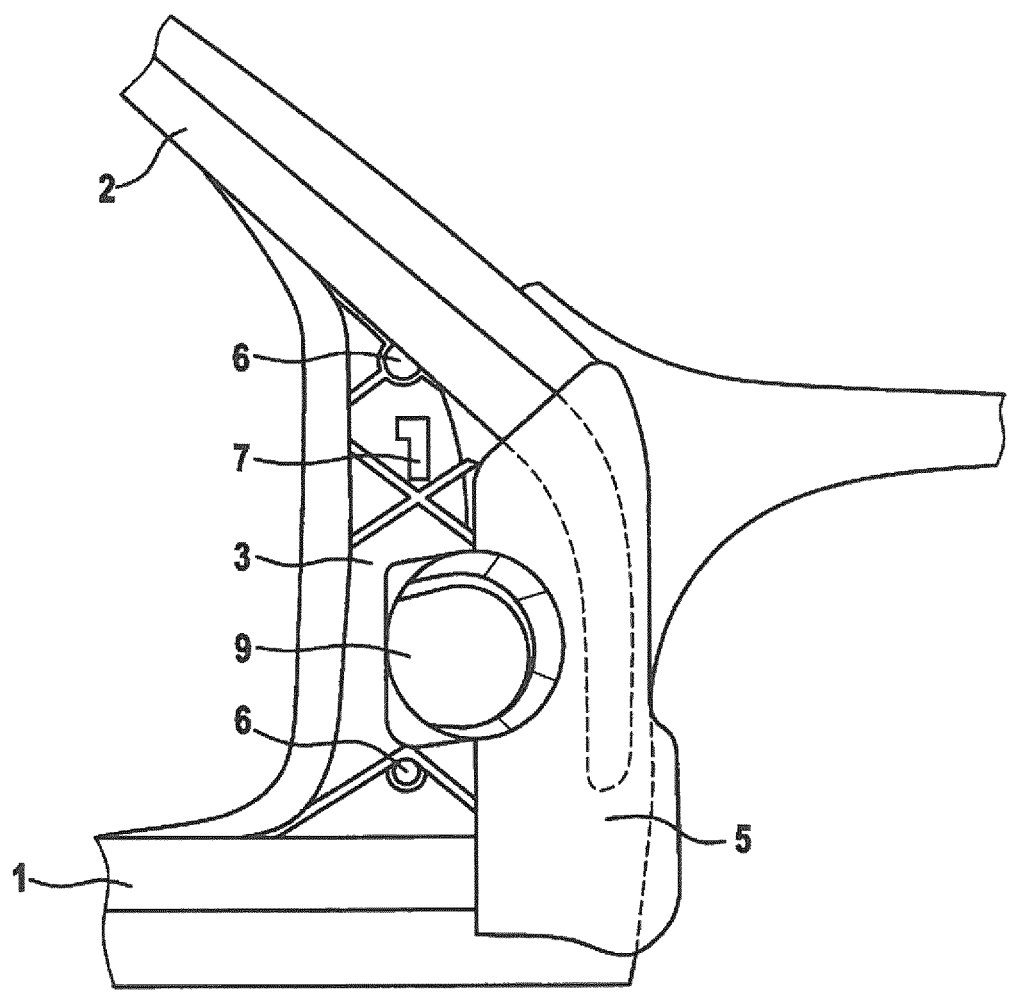
FIG. 2 is a simplified side view of a left A-pillar of a motor vehicle seen from the vehicle interior.

The assembly shown in FIG. 2 corresponds in structure to the assembly illustrated in FIG. 1, but is seen from the rear side, thus from the vehicle interior. As a result, the inner shell 5 may be seen in addition to the sill 1, the roof frame 2 and the hinge pillar 3. The roof frame 2 is thus partially covered by the inner shell 5, which encloses together with the outer shell (not shown) the sill 1, the roof frame 2 and the hinge pillar 3, resulting in a stable assembly component composite unit.

A speaker 9 is additionally shown as an exemplary equipment element. Other equipment or connecting elements may be provided.

Figure 3:
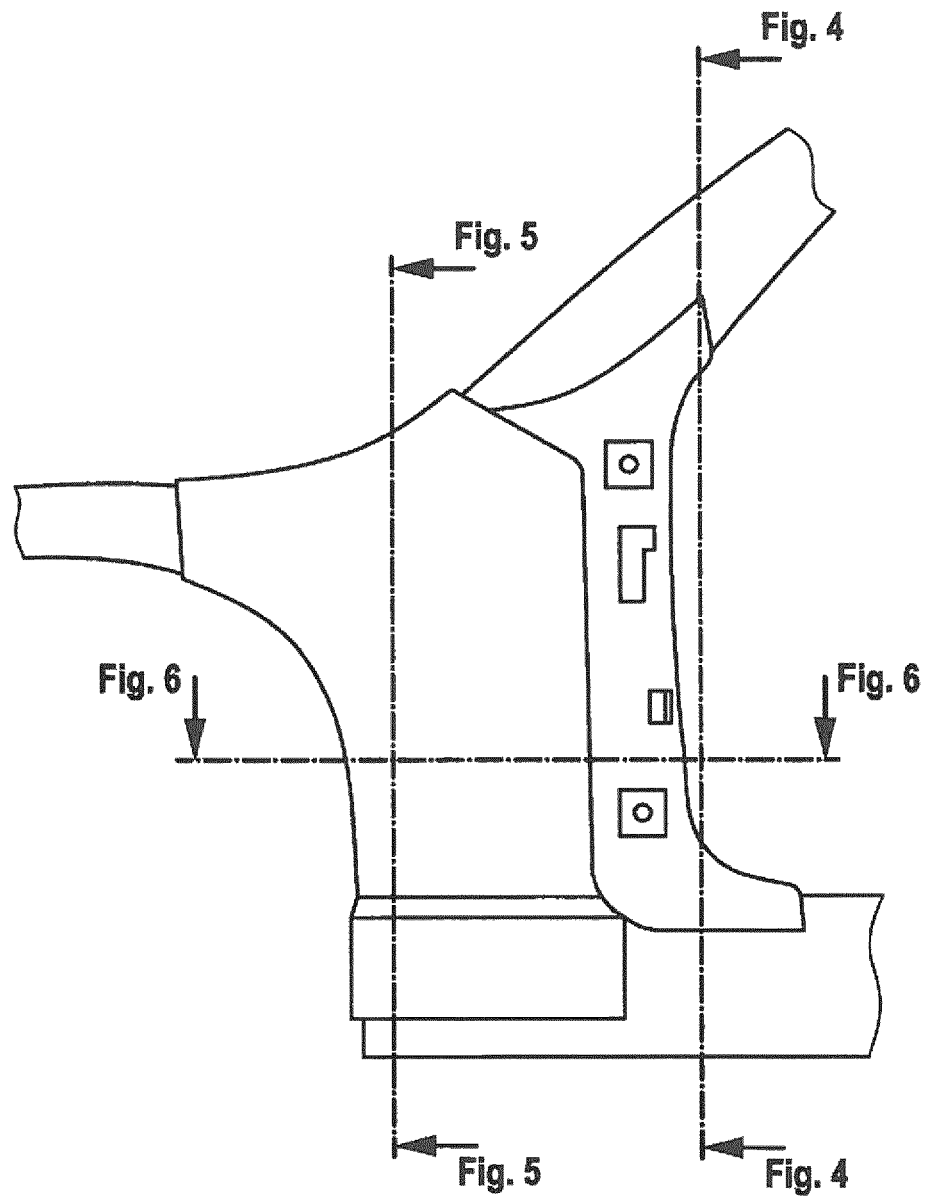
FIG. 3 shows an overview of the sectional views of the A-pillar of FIGS. 4 to 6 seen from the outside.
Figure 4:
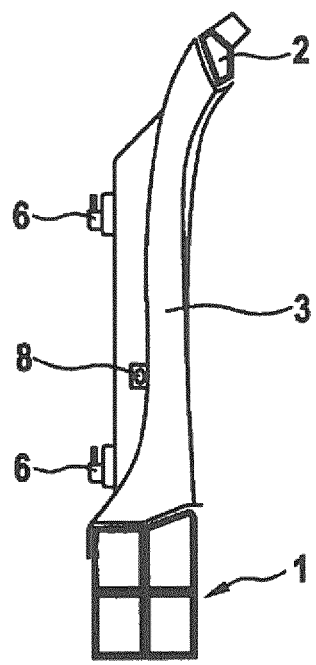
FIG. 4 is a vertical section view through an A-pillar behind the hinge pillar.
Figure 5:
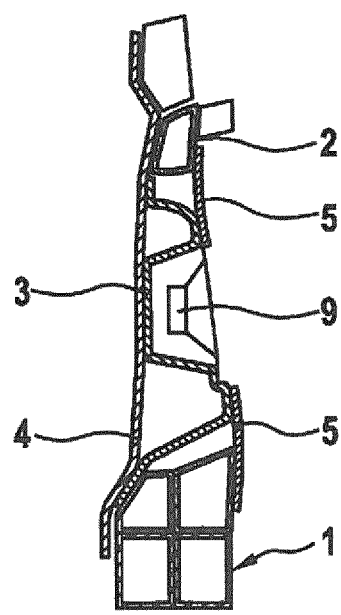
FIG. 5 is a vertical section view through an A-pillar at the height of the hinge pillar.
Figure 6:
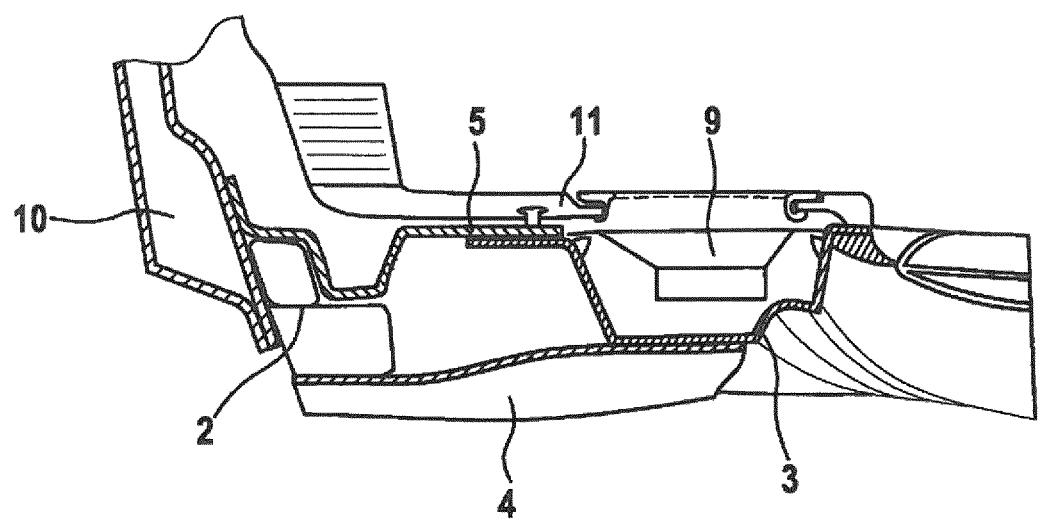
FIG. 6 is a horizontal section view through an A-pillar between an upper and lower hinge plane.

FIG. 3 provides an overview of the sectional views of FIGS. 4 to 6 of an A-pillar as has already been represented in FIG. 1, seen from the outside.

Individually, FIG. 4 shows a vertical section through the A-pillar of FIG. 1 behind the hinge pillar 3. The hollow profile, from which the sill 1 is formed, is clearly visible. By way of example, the sill 1 is formed from four hollow profiles. However, this is not required. The roof frame 2 is formed by way of example by an elongated hollow profile.

As has already been mentioned, for reasons of weight savings and better processability with the other assembly components, the hollow profile is preferably formed from a wound, braided or extruded fibrous composite. In view of rigidity and firmness, the hollow profile is advantageously formed from a carbon fiber composite material.

On the hinge pillar 3 can, in turn, be seen two door hinges 6 and the door check 8.

FIG. 5 shows a vertical section through the A-pillar of FIG. 1 at the height of the hinge pillar 3. In turn clearly visible is the roof frame 2 formed from a hollow profile, as well as the sill 1 formed from four hollow profiles. The inner shell 5 and the outer shell 4 enclose the sill 1, the roof frame 2 and the hinge pillar 3.

Furthermore, it can be seen that the hinge pillar 3 is formed in a meandering shape, which ensures a positive connection to the inner shell 5 and outer shell 4.

A speaker 9 is integrated into the hinge pillar 3 as an example of the integration of further equipment components. Other equipment components, fixing means and/or connecting elements may be provided.

FIG. 6 is a horizontal section through an A-pillar as shown in FIG. 1, between an upper and lower hinge plane. Here again is clearly visible the meandering shape of the hinge pillar 3, which is in connection with the outer shell 4 and the inner shell 5. Further shown are additional attached molded parts, such as an end wall 10 and a footwell lining 11, which may likewise be integrated into the assembly according to the invention.

LIST OF REFERENCE CHARACTERS 1 sill
2 roof frame
3 hinge pillar
4 outer shell
5 inner shell
6 door hinge 7 wire harness feedthrough
8 door check
9 speaker
10 end wall
11 footwell lining The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly for a vehicle body, comprising:
   a sill;
   a roof frame;
   a hinge pillar provided separately from the sill and the roof frame;
   an outer shell; and
   an inner shell, wherein
   the sill and the roof frame are formed by hollow profiles extending along a longitudinal direction of the vehicle body in a vicinity of the hinge pillar,
   the hinge pillar is made of an extruded fibrous composite, and
   the sill, the roof frame, and the hinge pillar are at least partially surrounded on an outer side by the outer shell and on an inner side by the inner shell such that the sill, the roof frame, the hinge pillar, the outer shell, and the inner shell form a composite unit.

2. The assembly according to claim 1, wherein the hollow profiles are formed of a wound, grated, or extruded fibrous composite.

3. The assembly according to claim 2, wherein the fibrous composite is a carbon fiber composite material.

4. The assembly according to claim 1, wherein the outer and inner shells are formed of a fibrous composite.

5. The assembly according to claim 4, wherein the fibrous composite is a carbon fiber composite material.

6. The assembly according to claim 4, wherein the fibrous composite has a fiber structure or fiber fabric, or is formed at least partially from a metallic material.

7. The assembly according to claim 4, wherein fibers in the fibrous composite of the outer and inner shells are oriented, continuous fibers, said oriented, continuous fibers being aligned in a main loading direction of the assembly.

8. The assembly according to claim 1, wherein the extruded fibrous composite of the hinge pillar is a carbon fiber composite material having fibers with a fiber length from 8-40 mm.

9. The assembly according to claim 1, wherein the extruded fibrous composite of the hinge pillar is a carbon fiber composite material having fibers with a fiber length from 10-30 mm.

10. The assembly according to claim 1, further comprising high-strength adhesive bonds connecting the sill, roof frame, hinge pillar, outer shell, and inner shell together.

11. The assembly according to claim 1, wherein the composite unit is designed to have a ductility sufficient to absorb energy in an event of a crash and to ensure connection of the sill, roof frame, hinge pillar, outer shell, and inner shell assembly components even upon a partial destruction of an individual one of the assembly components.

12. The assembly according to claim 1, wherein the hinge pillar is configured to have a meandering shape.

13. The assembly according to claim 12, wherein the hinge pillar comprises further components.

14. The assembly according to claim 13, wherein the further components comprises one or more of fixtures for door hinges, door checks, wire harness feedthroughs, equipment components and fastening elements for interior trim components.

15. The assembly according to claim 1, wherein the assembly forms an A-pillar of the vehicle body.

* * * * *